Dec. 5, 1933.  J. J. NEVILLS  1,937,905
FRUIT PITTER
Filed March 16, 1931    4 Sheets-Sheet 1
FIG_1_
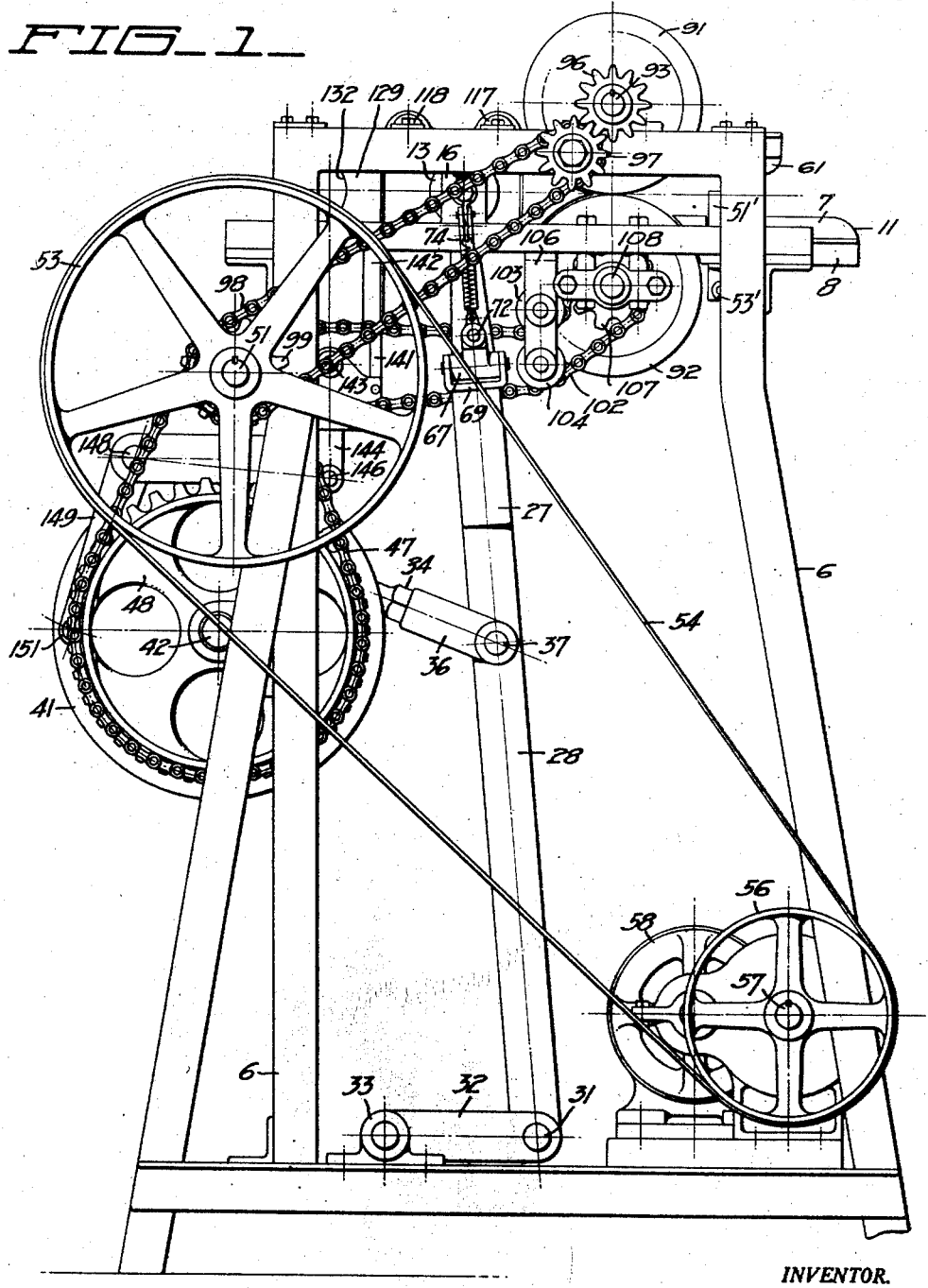
INVENTOR.
John J. Nevills
BY
White, Prat, Fehr & Lothrop
ATTORNEYS.

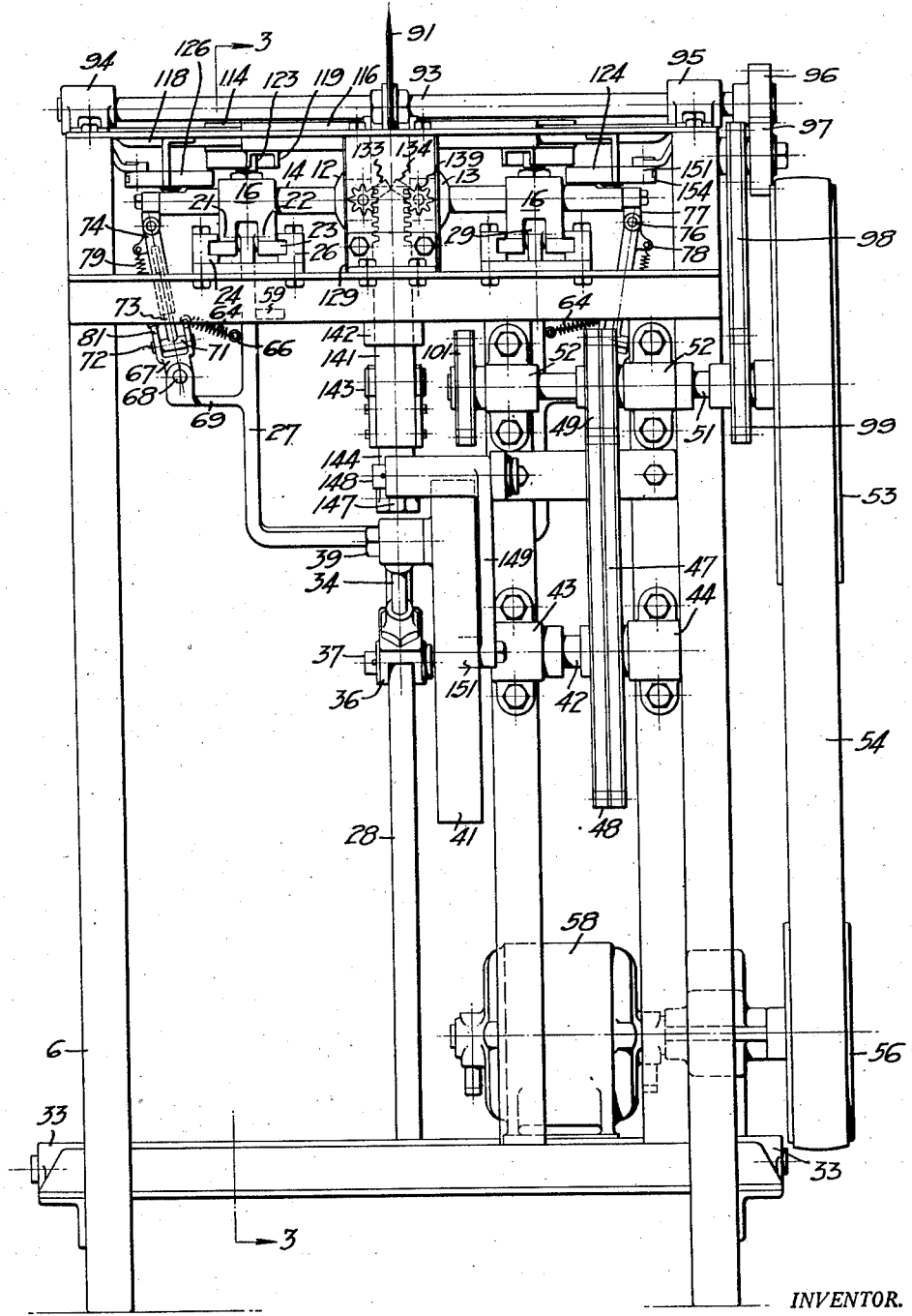
FIG_2_

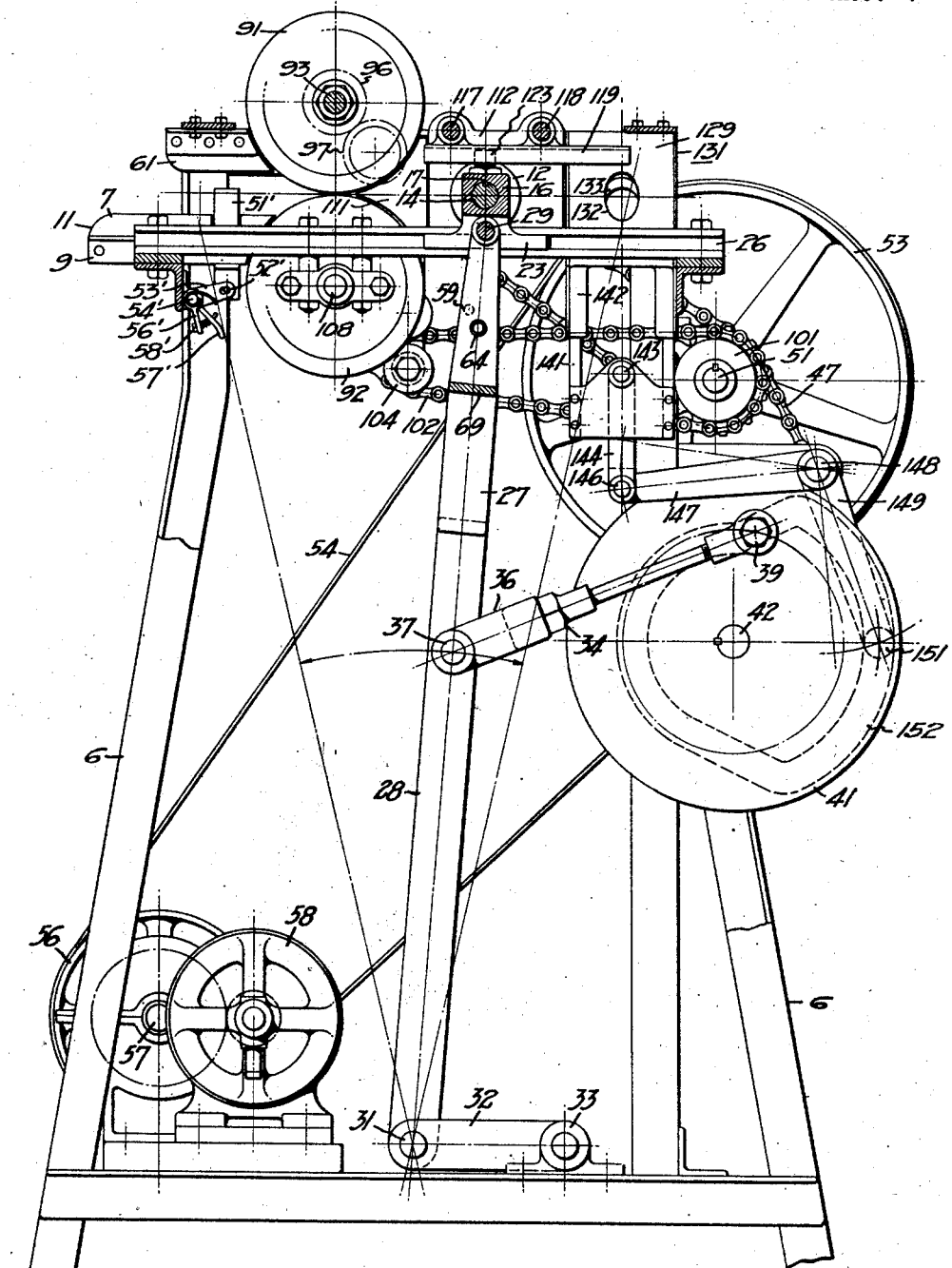
FIG_3_

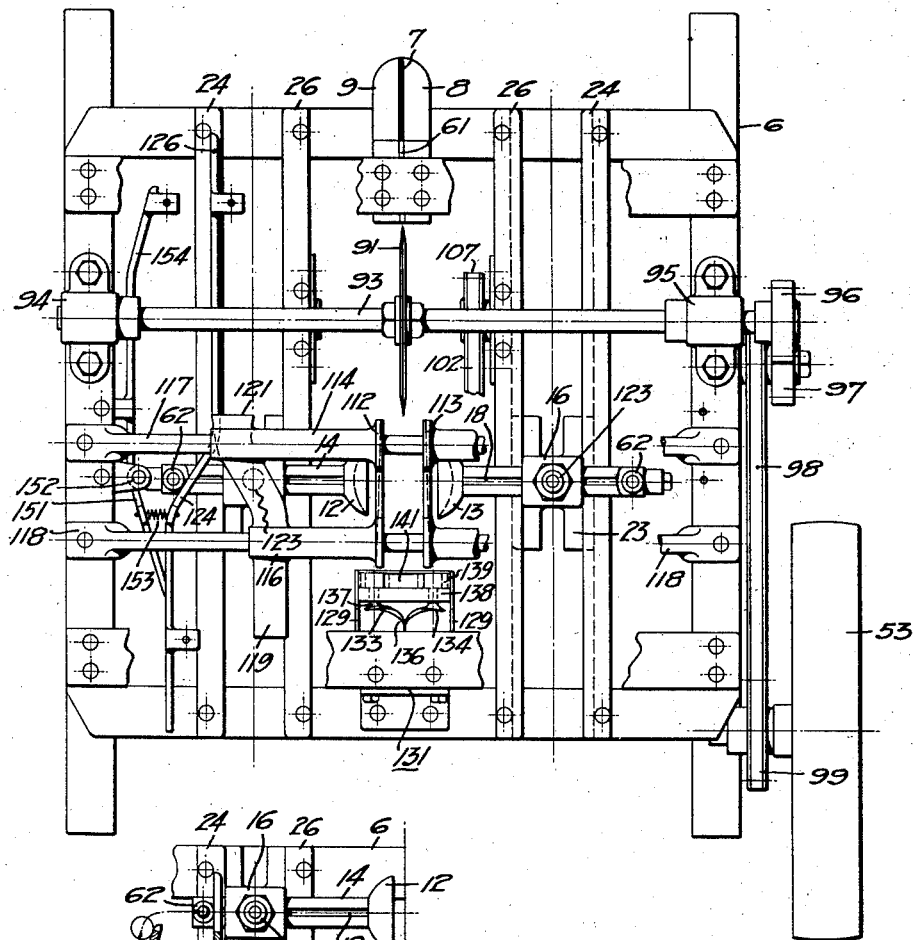
FIG_4_
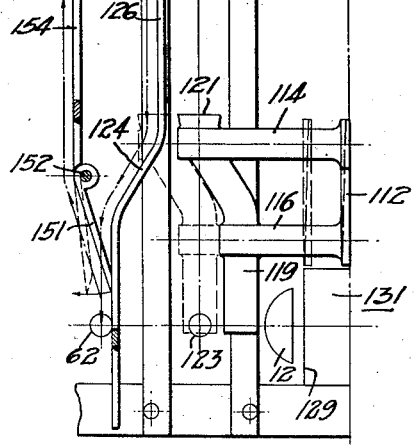
FIG_5_
INVENTOR.
John J. Nevills
BY
White, Prost, Hehr & Lothrop
ATTORNEYS.

Patented Dec. 5, 1933

1,937,905

UNITED STATES PATENT OFFICE 1,937,905

FRUIT PITTER

John J. Nevills, Oakland, Calif., assignor to Libby, McNeill & Libby, San Francisco, Calif., a corporation of Maine Application March 16, 1931. Serial No. 522,823

3 Claims. (Cl. 146—28)

My invention relates to mechanisms for removing the stones or pits from fruit such as peaches, apricots and the like and is more particularly concerned with a mechanism for removing pits from peaches of the clingstone varieties.

One general class of machines for pitting peaches entails mechanisms first for receiving the peach in a pre-determined position so that the suture or plane of maximum pit diameter is coincident with the central plane of the machine and subsequently splitting or cutting the whole peach on this plane into two portions, usually denominated halves, each of which then comprises a half-peach including a divided or half-pit. The half-peaches are subsequently propelled through the machine, usually in contact with a central plate which diverges or is widened and is designated the divider or separator plate. As the half-peaches progress through the machine in contact with the divider plate they come into registry with apertures piercing the divider plate. At a suitable time interval in the cycle of operation of the machine knives or similar devices operating through the apertures in the divider plate cut the half-pit from the half-peach leaving the flesh or meat portion of the fruit in contact with the divider plate and pulling or forcing the half-pits through the apertures. The half-pits are then conveyed away or are collected for subsequent removal while the pitted half-peaches are discharged from the machine for further processing.

In such machines it is customary to provide one or more operators for each machine and the speed of the machine is largely dependent upon the speed with which an operator can feed peaches into the machine. In most instances some sort of conveyor is utilized for initially receiving the peaches and since the conveyor is usually a constant speed mechanism the speed of the entire machine is limited by the speed with which the operator can feed the peaches into the moving conveyor.

Another factor governing the operation of such machines is the fact that the divider plate must necessarily be of wedge shape or must diverge from the point at which the cut peaches are first superposed thereon to the point at which the pitting knives are located. Since the pitting knives require considerable transverse space the degree of divergence of the divider plates is often considerable particularly in view of the fact that the machines must have as short a length as possible in order to conserve floor space.

It is an object of my invention to provide a fruit pitter in which the fruit is received at a different and slower speed than the speed at which it is conveyed to the pitting mechanism.

Another object of my invention is to provide a fruit pitter in which the divider plate need not diverge or be of wedge shape.

Another object of my invention is to provide a fruit pitter which has a small number of operating parts so that the cost of an individual machine for a single operator is not large.

The foregoing and other objects are attained in the embodiment of the invention shown in the drawings, in which Figure 1 is a side elevation of a fruit pitter constructed in accordance with my invention.

Figure 2 is an end elevation of a fruit pitter constructed in accordance with my invention.

Figure 3 is a cross section, the plane of which is indicated by the line 3—3 in Figure 2.

Figure 4 is a plan of a fruit pitter constructed in accordance with my invention, portions being broken away to improve the clarity of the disclosure.

Figure 5 is a fragmentary view of a portion of the cam tracks of the mechanism, certain portions being omitted to increase the clearness of the showing.

In its preferred form, the fruit pitter of my invention comprises means for receiving a fruit to be pitted with the plane of the suture of the fruit substantially coinciding with the central plane of the mechanism together with means for holding and advancing the fruit through the machine always maintaining the predetermined position of the fruit with respect to the central plane of the machine combined with additional means for cutting the fruit and the contained pit into two portions together in addition to means for moving the divided portions of the fruit substantially transversely of the machine, that is, substantially normal to the direction of advance coacting with further means for cutting the half pit from the half fruit and arranged with means for reciprocating the fruit holders so that at each end of the reciprocatory motion where the holders are substantially at rest there is opportunity at one end for feeding fruit to be pitted into the machine and at the other end for pitting the fruit.

Although the machine of my invention is generally applicable to removal of pits from fruit it is particularly referred to herein and is especially described in conjunction with the pitting of clingstone varieties of peaches since such an environment presents probably the most difficult problem for a pitting mechanism.

In the form of my fruit pitter shown in the drawings there is provided a framework 6 conveniently fabricated of the usual structural shapes such as channel and angle irons to provide a suitable support for the remainder of the mechanism. At the forward end of the machine at which the operator is stationed for feeding whole fruit into the machine, there is provided a means for receiving the fruit. In the present instance this means comprises a blade 7 which is suitably held between a pair of angle irons 8 and 9 mounted on the framework 6. The blade is disposed with its edge upright and the leading or initial portion thereof is rounded, as at 11, to insure easy positioning of the fruit thereon. The angle irons 8 and 9 are in substantially the same horizontal plane so that they provide an additional support for the fruit. In impaling a peach on the blade 7, the operator positions the fruit with the suture or external crease which indicates the plane of maximum dimension of the pit in substantially the same plane as that of the blade 7. The peach is thus positioned in a predetermined location with respect to the central plane of the machine as indicated by the plane of the blade 7.

In order to convey the peach from its initial station where it is impaled on the blade 7 and throughout the remainder of the machine I preferably afford a pair of opposed cups 12 and 13 each of which is substantially a hollow hemisphere mounted at the inner extremity of a plunger 14 adapted to reciprocate in a block 16. The plunger 14 is constrained against rotary motion in the block 16 by a co-operating key 17 in the block which functions in a groove 18 cut in the plunger 14. Since, with respect to the cups 12 and 13, the two sides of the machine are substantially identical but one side is described. The bottom of each of the blocks 16 is bifurcated to provide legs 21 and 22 each of which terminates in a projection 23. The projections 23 are constrained to move in a pair of opposed rails 24 and 26 which are bolted or otherwise fastened to the main framework 6 and provide guides for constraining the movement of the block 16 to assure rectilinear translation thereof.

In order to propel the blocks 16 between peach receiving position and peach pitting position and in order that the blocks may be moved very slowly at both these positions but more rapidly between such positions I provide means for reciprocating the blocks within the rails 24 and 26. Suitably mounted within the bifurcated legs 21 and 22 of each block is an appropriate fork 27 of a connecting arm 28. The arm 28 is not only journalled, as at 29, at each of its upper fork ends but at its lower end is pivotally mounted as at 31 on a link 32 fixed pivotally in a journal 33 on the framework 6.

In order to impart reciprocatory motion to the arm 28 a pitman 34 is connected by a yoke 36 and a pin 37 to the arm and is also connected by a pin 39 to a disc 41 mounted on a shaft 42 carried in journal blocks 43 and 44 on the framework 6. The shaft 42 is rotated by means of chains 47 which encompass a sprocket 48 on the shaft 42 and also a sprocket 49 on a cross shaft 51 mounted in journals 52 carried by the framework 6. A pulley wheel 53 is mounted on an overhanging portion of the shaft 51 and is engaged by a belt 54 extending to a pulley 56 on a speed reducer shaft 57 which is associated with a source of power such as an electric motor 58 supported by the framework 6.

By virtue of this motion train, rotation of the motor 58 revolves the speed reducer shaft 57 and imparts rotation to the shaft 51 through the belt 54. The cross shaft 51 drives the shaft 42 by means of the chains 47 so that upon rotation of the disc 41 the pitman 34 reciprocates the arm 28 and causes a reciprocatory motion of the blocks 16. This arrangement causes the blocks 16 to move between extreme positions one of which is the receiving station adjacent the impaling blade 7 and the other is the pitting station presently to be described. The blocks not only travel between these two locations but come to an instantaneous halt at the two stations. This is of particular advantage at the impaling or feeding station inasmuch as the operator need not contend with a rapidly moving continuous speed conveyor but can position the peach on the blade 7 and have it removed from the station while the blocks 16 carrying the opposed cups 12 and 13 are moving relatively slowly.

In order that the peach may be accurately positioned on the blade 7 in addition to having its central plane coincide with the central plane of the machine, I preferably provide a stop 51' which is co-planar with the blade 7 and which itself comprises a vertically movable blade. This blade projects into the path of the fruit and is withdrawable therefrom, inasmuch as its motion is restrained to a vertical reciprocation between guides formed by the blade 7 and its mounting. The lower end of the stop 51' carries a pin 52' which is engaged by a slotted lever 53' pivotally mounted as at 54' on the framework 6. The lever 53' carries an extension 56' with respect to which a projection 57' is adjustably mounted by means of a bolt 58' so that the angular displacement between the projection 57' and the extension 56' can be varied. The projection 57' is contacted by a pin 59 mounted on the upper end of the arm 28 so that as the arm reciprocates towards fruit receiving position the pin 59 contacts the projection 57' and rotates the levers 56' and 53' about the pin 54' thus withdrawing the stop 51' from the path of a fruit impaled on the blade 7.

When the fruit is initially impaled on the blade 7 it is thrust forwardly into the machine until the pit contacts the stop 51' and can therefore progress no farther into the machine under urgency of the operator until the arm 28 has reciprocated to its approximate forward position whereupon the stop 51' being withdrawn a free path through the machine is left for the fruit. As the fruit comes into engagement with the stop 51' and starts its progress through the machine it is additionally engaged with an upper blade 61 co-planar with the blade 7 and carried likewise by the framework 6 of the machine.

In order suitably to operate the cups 12 and 13 during their progress through the machine and particularly at fruit receiving position I construct each of the plungers 14 at its outer extremity with an upwardly extending roller 62 adapted not only to rotate on its own axis but to move bodily with the shaft 14 to govern the movement of the respective cups 12 and 13. Normally the cups are urged toward each other and to this end I provide for each of them a coiled spring 64 one end of which is attached to an eye 66 mounted on the fork 27 of the arm 28 and the other end of which is in engagement with one arm of a fork 67 pivotally attached as at 68 to an extension 69 on the fork 27. Likewise carried by the fork 67 is a T-rod 71 mounted for pivotal movement by a pin 72 and having an extension 73 in telescopic engagement with a sleeve 74 connected by a pivot pin 76 to a depending portion 77 at the extremity of the plunger 14. In order to maintain the assembly in suitable position, an ear 78 on the sleeve 74 is connected by a coil spring 79 with a suitable ear 81 on the fork 67. The effect of the springs 79 and 64 is to urge the cups 12 and 13 toward the central plane of the machine, that is, to approach each other.

As the arm 28 is moved toward the fruit receiving position adjacent the blade 7, there is no constraint placed on the cups 12 or 13 except the bias or urgency of the springs 64 and they therefore grasp a fruit impaled on the blades 7 and 61 and lying with its pit previously against the stop 51'. Since the stop 51' is withdrawn when the arm 28 is moved to the impaling position there is no hindrance to the advancing movement of the fruit which then progresses through the machine under urgency of the movement of the arm 28 and of the cups 12 and 13.

As the fruit advances in the central plane of the machine, it comes into contact with a pair of revolving knives 91 and 92. These knives preferably are circular discs having knife edges but may be serrated if desired. The upper knife 91 is disposed on a shaft 93 mounted in journals 94 and 95 on the framework 6 of the machine and having an overhanging portion carrying a gear 96. Meshing with the gear 96 is a similar gear 97 for the purpose of reversing rotation. Driving the gear 97 is a chain 98 meshing with a sprocket 99 carried on the shaft 51. Also carried on the shaft 51 is a sprocket 101 driving a chain 102 which passes over idlers 103 and 104, mounted rotatably on a bracket 106 depending from the frame 6, and meshing a sprocket 107 on a shaft 108 carrying the knife 92. By virtue of this arrangement the knives 91 and 92 are driven in opposite directions with adjacent peripheries moving in the direction of advance of the fruit.

After the fruit has been cut into two portions approximating halves by the knives 91 and 92 it is further advanced by advancing movement of the cups 12 and 13 and is separated by a divider 111 which is stationary and which conforms approximately to the peripheral contour of the knives 91 and 92. Behind the divider 111 is a pair of divider plates 112 and 113 the thickness of which when considered together is equal to the thickness of the divider 111. The divider plates 112 and 113 are substantially identical; each of them comprises a relatively thin plate mounted on a pair of sleeves 114 and 116 which are slidable on stationary rods 117 and 118 fixed to the framework 6 of the machine. The divider plates 112 and 113 are thus translatable on the guides or rods 117 and 118 in a direction substantially normal to the direction of advance of the cups 12 and 13 and of the progress of the fruit through the machine.

The divider plates 112 and 113 are adapted substantially to abut and to continue the surface of the divider 111 until such time as the cups 12 and 13 have come into substantial registry therewith. At such time the divider plates 112 and 113 are separated from each other in conjunction with separating movement of the cups 12 and 13. This movement is effected by providing a channel 119 joining the sleeves 114 and 116. The channel is flared at its leading end 121 to facilitate the reception of a roller 123 projecting upwardly from the block 16. The contour of the channels 119 is such that upon advancing rectilinear movement of the rollers 123 the sleeves 114 and 116 are translated to separate the plates 112 and 113.

At the same time, the cups 12 and 13 are separated from each other by virtue of the engagement of the rollers 62 with an inclined portion 124 of cam tracks 126 provided on the framework 6 in mirror symmetry. As the arm 28 moves toward the pitting station of the machine, the roller 123 not only engages the channel 119 but the roller 62 likewise engages the cam track 126 at its inclined portion 124 so that the cup 12 and the divider plate 112 simultaneously are moved bodily transversely of the machine and away from the bodily movement synchronously of the plate 113 and the cup 13. The half-fruit held between the plate and the cup therefore is moved bodily not only in the direction of advance of the cup but also with a component at right angles or normal thereto.

The cups 12 and 13 and the plates 112 and 113 are moved transversely a sufficient distance so that the surfaces of the plates 112 and 113 are coplanar with the side surfaces 129 of a pitting assembly, generally designated 131. As the plates 112 and 113 come into surface registry with the sides 129 of the pitting assembly further advancing movement of the cups 12 and 13 moves the half-fruit into registry with a pair of apertures in the walls of the assembly 131 one of the apertures 132 being clearly shown in Figure 3. When the half-fruit has arrived at this station in registry with the apertures 132, the cups stop instantaneously, by virtue of the reciprocating motion of the arm 28, and afford ample time for the pitting operation to take place.

Located within the pitting assembly 131 is a pair of pitting knives 133 and 134 each of which is of any desired design and preferably comprises a blade 136 connected to a shaft 137 journalled in the framework 138 of the pitting assembly 131 and carrying a pinion 139. Adapted to mesh with each of the pinions 139 is a rack 141 carrying teeth on opposite sides and movable with a reciprocatory motion in a guide 142 mounted on the framework 6. Connected to the rack 141 by a pivotal connection 143 is a link 144 extending to a pivotal connection 146 with one arm 147 of a lever. The lever is provided with a pivotal mounting as at 148 on the framework 6 and carries an arm 149 at one extremity of which is located a roller 151', constrained to move in a cam groove 152' cut in the side of the disc 41 so that the proper time relationship is obtained between the movement imparted to the arm 28 by the pitman 34 and of the movement of the rack 141. The rack 141 is suitably reciprocated so that the pitting knives 133 and 134 each describes at least a portion of a revolution and in protruding through the aperture 132 serves to cut the half-pit from the half-fruit in registry therewith.

Upon the conclusion of this operation the time relation is such that the arm 28 moves toward receiving station adjacent the impaling blade 7 and discharges the half-pit removed from the fruit through the pitting assembly 131 to a suitable receptacle or to a conveyor, not shown.

The half peaches then are returned by virtue of the movement of the arm 28 toward the feeding end of the machine until such time as the rollers 62 on the shaft 14 engage switches 151 pivotally mounted as at 152 on the framework 6 of the machine and adapted ordinarily to overlie the extension of the cam tracks 126 by virtue of the tension of suitable springs 153. As the arm 28 returns to its initial or impaling position the cups 12 and 13 are further separated from each other by virtue of the rollers 62 riding over the inclined switches 151 and since in the return movement of the blocks 16 the rollers 123 return the plates 112 and 113 to substantial abutting position in the central plane of the machine there is ample opportunity for the pitted peach halves to drop from the cups 12 and 13 either into a suitable receptacle or a conveyor not shown. Further movement of the arm 28 toward the initial end of the machine causes the rollers 123 to become disengaged from the channels 121 leaving the plates 112 and 113 in original position and causing the rollers 62 to return on a cam track 154, suitably supported on the framework 6, holding the cups 12 and 13 in separated position until they come to the end of the cam track 154. The end of the cam track is so located with respect to the impaling blade and the stop 51' that just as the arm 28 completes its reciprocation toward the impaling end of the machine, the rollers 62 leave the end of the cam tracks 154 and under the urgency of springs 64 snap toward each other to grasp another fruit impaled previously on the blade 7 and abutting the stop 51'.

In the cycle of operation of my fruit pitter the fruit is impaled and is pitted at the end of a reciprocation of the conveying or advancing mechanism so that advantage is taken of the instantaneous stop inherent therein. Furthermore, the fruit after having been cut into two portions is moved with a component normal to the direction of advance a sufficient distance apart so that the two halves are easily accommodated on the pitting mechanism and without being forced to slide over a wedge shaped or divergent divider plate. Such an operation of the machine entails a relatively high rate of pitting inasmuch as the operator is working under favorable conditions and particularly because there are only a few peaches which must be rejected because of imperfect pitting inasmuch as the peach is mechanically conveyed throughout its path without being subjected to any undue compressive strains.

It is to be understood that I do not limit myself to the form of the fruit pitter shown and described herein, as the invention, as set forth in the following claims may be embodied in a plurality of forms.

I claim:

1. A fruit pitter comprising a frame, a blade on said frame adapted to receive a fruit, means for advancing a fruit on said blade, a stop in the path of advance of said fruit, and means actuated by said advancing means for withdrawing said stop from the path of said fruit.

2. A fruit pitter comprising a frame, a blade on said frame adapted to receive fruit, means on said frame for pitting fruit, reciprocating means on said frame for advancing fruit from said blade to said pitting means, means on said frame for dividing said fruit into two portions, a pair of parallel divider plates on said frame over which said divided fruit is advanced, and means for separating said divider plates while maintaining their parallelism as said fruit is advanced thereover.

3. A fruit pitter comprising a pair of divider plates, means for advancing portions of fruit over said divider plates, and means for separating said divider plates by a translatory movement during the advance of said portions thereover.

JOHN J. NEVILLS.